United States Patent
Tremblay et al.

(10) Patent No.: US 6,571,319 B2
(45) Date of Patent: May 27, 2003

(54) METHODS AND APPARATUS FOR COMBINING A PLURALITY OF MEMORY ACCESS TRANSACTIONS

(75) Inventors: Marc Tremblay, Menlo Park, CA (US); Shrinath Keskar, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/325,625

(22) Filed: Jun. 4, 1999

(65) Prior Publication Data

US 2002/0184460 A1 Dec. 5, 2002

(51) Int. Cl.[7] .............................................. G06F 12/00
(52) U.S. Cl. ..................... 711/140; 711/150; 711/169; 711/210
(58) Field of Search .................................. 711/140, 150, 711/168, 169, 210, 143, 142

(56) References Cited

U.S. PATENT DOCUMENTS

| | | | |
|---|---|---|---|
| 4,631,668 A | | 12/1986 | Kubo et al. |
| 4,750,154 A | | 6/1988 | Lefsky et al. |
| 5,432,918 A | * | 7/1995 | Stamm ........................ 711/156 |
| 5,526,510 A | * | 6/1996 | Akkary et al. ................. 710/57 |
| 6,047,356 A | * | 4/2000 | Anderson et al. ............ 711/129 |
| 6,081,873 A | * | 6/2000 | Hetherington et al. ...... 711/131 |
| 6,122,715 A | * | 9/2000 | Palanca et al. .............. 711/154 |
| 6,289,419 B1 | * | 9/2001 | Takahashi .................... 711/118 |
| 6,408,357 B1 | * | 6/2002 | Hanmann et al. ........... 711/113 |

FOREIGN PATENT DOCUMENTS

EP 0886216 12/1998

OTHER PUBLICATIONS

"Gathering Store Instructions in a Superscalar Processor", IBM Technical Disclosure Bulletin, vol. 39, No. 9, Sep. 1996.

* cited by examiner

*Primary Examiner*—Matthew Kim
*Assistant Examiner*—Matthew D. Anderson
(74) *Attorney, Agent, or Firm*—Finnegan, Henderson, Farabow, Garrett & Dunner, L.L.P.

(57) ABSTRACT

Instruction combining logic combines data from a plurality of write transactions before the data is written into main memory. In one embodiment, the instruction combining logic receives write transactions generated from store pair instructions, stores data from the write transactions in a buffer, and combines the data in the buffer. The combined data is subsequently written to memory in a single write transaction. The instruction combining logic may determine whether the data from the transactions are in the same cache line before combining them. A programmable timer may be used to measure the amount of time that has elapsed after the instruction combining logic receives the first write transaction. If the elapsed time exceeds a predetermined limit before another write instruction is received, the instruction combining logic combines the data in the buffer and writes it to memory in a single write transaction.

13 Claims, 3 Drawing Sheets

METHODS AND APPARATUS FOR COMBINING A PLURALITY OF MEMORY ACCESS TRANSACTIONS

BACKGROUND OF THE INVENTION

1. Field of the Invention

The present invention relates to methods and apparatus for processing memory access instructions. More particularly, one aspect of the invention relates to methods and apparatus for combining data from a plurality of memory access transactions, such as store pair transactions or instructions, and writing the combined data to memory in a single memory access transaction.

2. Description of the Related Art

Modern computers are typically equipped with several basic components: one or more processors, main memory, cache memory, and a memory controller. In one conventional configuration of such a computer, the processor connects to the cache memory and to the memory controller. The cache memory is also connected to the memory controller. The memory controller is connected to the main memory through one or more memory buses (e.g., a memory data bus and a memory address bus).

Because cache memory is characteristically higher in performance than main memory, the processor accesses data from the cache memory, rather than main memory, whenever possible during normal operation. This may require, from time to time, transferring data between the cache memory and the main memory. Such data transfers often occur in bursts where blocks of data are transferred at a time. For example, the cache memory may transfer data from a plurality of cache lines to the memory controller to be written in main memory. A "cache line" refers to a unit by which data is organized in the cache memory and is typically thirty-two bytes (four 8-byte words or "beats") in length.

Although the processor accesses data from the cache memory, the processor may also access data from the main memory. One specific example of an instruction to write data to main memory is referred to as a "store pair instruction." In executing a store pair instruction, the processor (or a component of the processor) fetches one beat of data to be written in main memory and the address at which the data is to be written in main memory. The processor then translates the instruction, the fetched data, and the fetched address into a memory store instruction. The processor transmits the memory store instruction to the memory controller for execution.

To facilitate the processing of memory store instructions by the memory controller, memory store instructions normally follow a fixed format. Although the exact format of the bus write command may vary depending upon the memory controller and the processor used, a typical memory store instruction contains the following information: (1) a write command; (2) a fixed number of beats of data (usually representing a full cache line); (3) byte enable information specifying which or how many of the bytes in the fixed number of beats are to be actually written in memory; and (4) the address in main memory at which the specified bytes are to be written. Where a memory store instruction is generated directly from a store pair instruction, the byte enable information specifies that bytes from only one of the fixed number of beats contained in the write transaction is to be written in memory.

Generating a memory store instruction for each store pair instruction, however, results in wasted bandwidth. Such a memory store instruction causes only a single beat of data to be written in memory, even though the format of a memory store instruction allows up to four beats of data to be written. Accordingly, there is a need to reduce or eliminate wasted memory data bus bandwidth caused by execution of memory store instructions generated directly from store pair instructions.

SUMMARY OF INVENTION

Methods and apparatus consistent with the present invention reduce or eliminate wasted memory data bus bandwidth by combining certain memory store instructions before writing data into main memory.

In accordance with the invention, as embodied and broadly described, a system consistent with this invention comprises a method comprising the steps of receiving a first instruction to write a first data word at a first address of memory; receiving a second instruction to write a second data word at a second address of memory; determining whether the first instruction and the second instruction include data from the same cache line; and generating a combined instruction to write the first and second data words in the first and second addresses of memory, respectively, if the first instruction and the second instruction are determined to include data from the same cache line.

In another aspect, the invention comprises an apparatus comprising a device for receiving a first instruction to write a first data word at a first address of memory; a device for receiving a second instruction to write a second data word at a second address of memory; a device for determining whether the first instruction and the second instruction include data from the same cache line; and a device for generating a combined instruction to write the first and second data words in the first and second addresses of memory, respectively, if the first instruction and the second instruction are determined to include data from the same cache line.

Both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and, together with the Detailed Description, serve to explain the principles of the invention.

In the drawings.

DETAILED DESCRIPTION

Introduction

Methods and apparatus consistent with the present invention reduce the number of memory store instructions executed and eliminate wasted bandwidth on the memory data bus. According to one aspect of the invention, instruction combining logic combines data from a plurality of memory store instructions before the data is written into main memory. The instruction combining logic receives memory store instructions generated from store pair instructions, stores data from the memory store instructions in a buffer, and combines the data in the buffer if they are from the same cache line. The combined data is written to memory in a single memory store instruction.

Moreover, a programmable timer may be used to measure the amount of time that has elapsed after the instruction combining logic receives a memory store instruction. If the elapsed time exceeds a predetermined limit before another memory store instruction is received, the instruction combining logic combines the data in the buffer and writes it to memory in a single memory store instruction.

Apparatus

Figure 1:
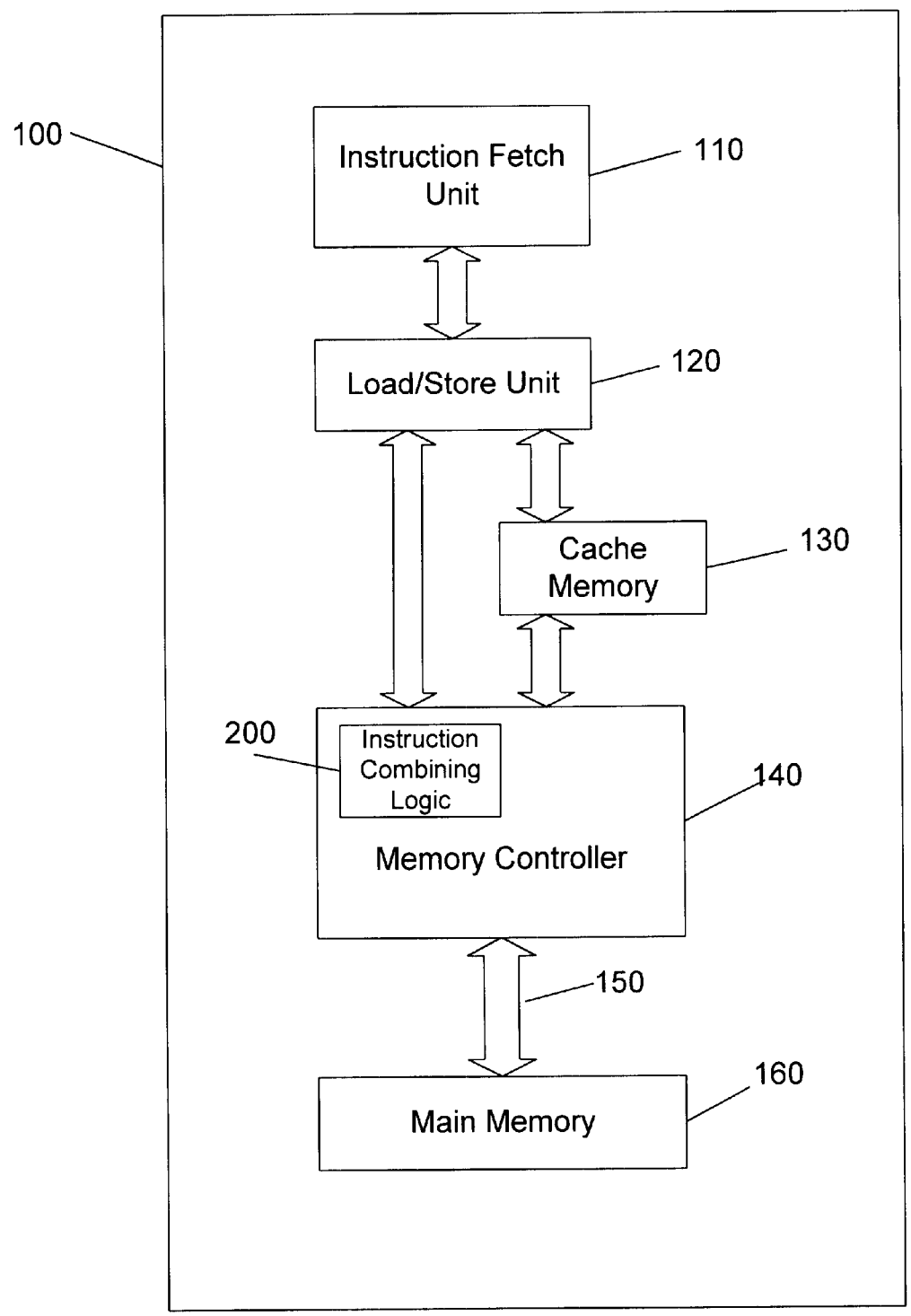
FIG. 1 is a block diagram of a system consistent with the invention.

FIG. 1 shows one configuration of a system consistent with the invention and is designated by reference numeral 100. System 100 includes several components, including instruction fetch unit 110, load/store unit 120, cache memory 130, memory controller 140, memory data bus 150, main memory 160, and instruction combining logic 200. Load/store unit 120 connects to instruction fetch unit 110, cache memory 130, and memory controller 140. Cache memory 130 connects to memory controller 140. Memory controller connects to main memory 160 through at least one memory bus, including memory data bus 150. FIG. 1 shows instruction combining logic 200 included in memory controller 140.

In one embodiment, system 100 is implemented as an integrated circuit with its components mounted on a common substrate and connected by conductive traces. Additional components may also be mounted on the common substrate in connection with the components shown in FIG. 1. In alternative embodiments, system 100 may be implemented as an integrated circuit with its components mounted on one or more substrates. In still alternative embodiments, system 100 may be implemented with one or more discrete components, programmable logic arrays, integrated circuits, or any combination thereof.

Instruction fetch unit 110 and load/store unit 120 preferably comprise conventional components of a processor. Instruction fetch unit 110 fetches program instructions, data and addresses, which are passed to load/store unit 120 to translate into an executable transaction. For memory store instructions, the format of the memory store instruction generated by load/store unit 120 includes: (1) a write command; (2) four beats of data (corresponding to a full cache line); (3) byte enable information specifying which or how many of the bytes in the four beats of data are to be actually written in memory; and (4) the address in main memory at which the specified bytes are to be written.

Instruction fetch unit 110 and load/store unit 120 are shown as examples of components with which the invention may operate. Alternatively, other processor components or circuitry may be used in place of instruction fetch unit 110 and load/store unit 120 without deviating from the principles of the invention. Such other processor components or circuitry, however, preferably output some form of instructions or commands to write data into main memory.

In a preferred embodiment, the instruction fetch unit 110 and load/store unit 120 (or alternatively the processor components or circuitry) may handle instructions to write data to memory. Specifically, units 110 and 120 may handle an instruction referred to as a "store pair instruction." A store pair instruction specifies that one beat of data is to be written in main memory. For purposes of explanation, the invention will be described in connection with combining store pair instructions. The invention, however, may be applied to other types of memory access instructions, such as instructions to write more than one beat of data in main memory, instructions to write data to the cache memory, and instructions to read data.

During operation, load/store unit 120 preferably generates a store pair transaction from a received store pair instruction. The store pair transaction generated from the received store pair instruction includes (1) a write command to write data in main memory; (2) one beat of data to be written in main memory and three beats of unused or filler data; (3) byte enable information specifying which bytes of the one beat of data is to be actually written in memory; and (4) the address in main memory at which the specified bytes of the one beat are to be written.

Cache memory 130 comprises a high speed random access memory in which data to be processed may be stored. Cache memory 130 is preferably higher in performance than main memory 160 and consequently may be smaller in capacity than main memory 160. Cache memory 130 is configured to transfer data to and from memory controller 140 in bursts and provide access to stored data to load/store unit 120. In a preferred embodiment, cache memory 130 organizes and stores data according to cache lines. In one embodiment, a cache line comprises four 8-byte words or beats.

Memory controller 140 comprises a device for controlling access to data stored in main memory 160. In a preferred embodiment, main memory 160 comprises a random access memory that is lower in performance than cache memory 130 and thus is larger in capacity than cache memory 130. In one embodiment, memory controller 140 is implemented as a state machine. In alternative embodiments, memory controller 140 may be implemented as a programmed device or a decoder for carrying out the functions of a memory controller. The functions performed by memory controller 140 may include dependency checks and protocol maintenance.

Memory data bus 150 transports data between memory controller 140 and main memory 160. Memory data bus 150 may be larger or smaller than a cache line.

Instruction combining logic 200 comprises logic for processing store pair instructions before execution and determines whether and how to combine store pair instructions to form fewer memory store instructions. Although FIG. 1 shows instruction combining logic 200 in memory controller 140, instruction combining logic 200 may be alternatively included in other components of system 100, such as instruction fetch unit 110 or load/store unit 120, or as an independent component. For purposes of explanation, however, instruction combining logic 200 will be described as included in memory controller 140 as shown in FIG. 1. The structure and operation of instruction combining logic 200 are described in greater detail in connection with FIGS. 2 and 3.

Figure 2:
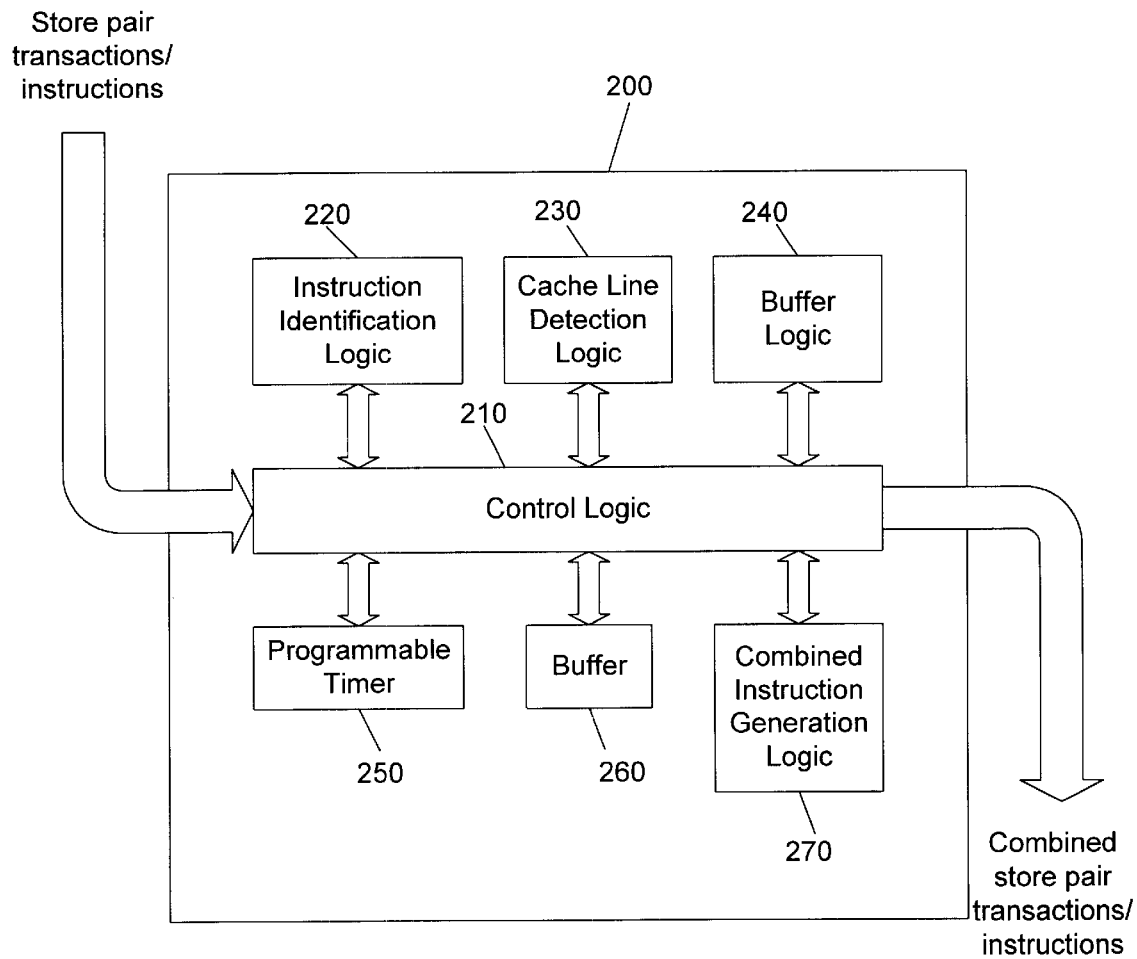
FIG. 2 is a block diagram of instruction combining logic 200 consistent with the invention.

FIG. 2 is a block diagram showing one arrangement for instruction combining logic 200. As shown in FIG. 2, instruction combining logic 200 includes control logic 210, instruction identification logic 220, cache line detection logic 230, buffer logic 240, programmable timer 250, buffer 260, and combined instruction generation logic 270. Logic 220, 230, 240, 270, programmable timer 250, and buffer 260 are connected to control logic 210. Instruction combining logic 200 may be implemented as a state machine, programmed processing unit, or other device for performing the functions described herein. The components of logic 200 may formed on one or more integrated circuits, discrete circuits, or any combination thereof.

As shown in FIG. 2, control logic 210 is configured to receive store pair transactions or instructions and, based upon processing by logic 220, 230, 240, 270, outputs combined store pair transactions or instructions. Control logic 210 preferably controls the operation and flow through which processing occurs in instruction combining logic 200.

Logic 220, 230, 240, 270 perform functions associated with the operation of instruction combining logic 200 as described in connection with FIG. 3. In alternative embodiments, more or fewer logic components may be used. In addition, in an alternative embodiment, instruction combining logic 200 may be implemented without a central logic component, such as control logic 210.

Programmable timer 250 tracks the elapsed time from the occurrence of an event, such as when an instruction has been received by instruction combining logic 200 or one of its components. The elapsed time may be measured in number of clocks cycles or any other conventional manner of measuring time. Programmable timer 250 may be programmed to output a timeout signal if a preset amount of time has elapsed before a reset signal is received or an event occurs. In a preferred embodiment, programmable timer is programmed before normal operation of system 100.

Buffer 260 temporarily stores portions of received store pair instructions or transactions. In a preferred embodiment, buffer logic 240 controls the storage of information in buffer 260, which may include data to be written in main memory 160 and addresses at which the data is to be written. Buffer 260 may comprise any conventional storage device for storing data, such as a random access memory, a FIFO, or a series of registers.

Process

Figure 3:
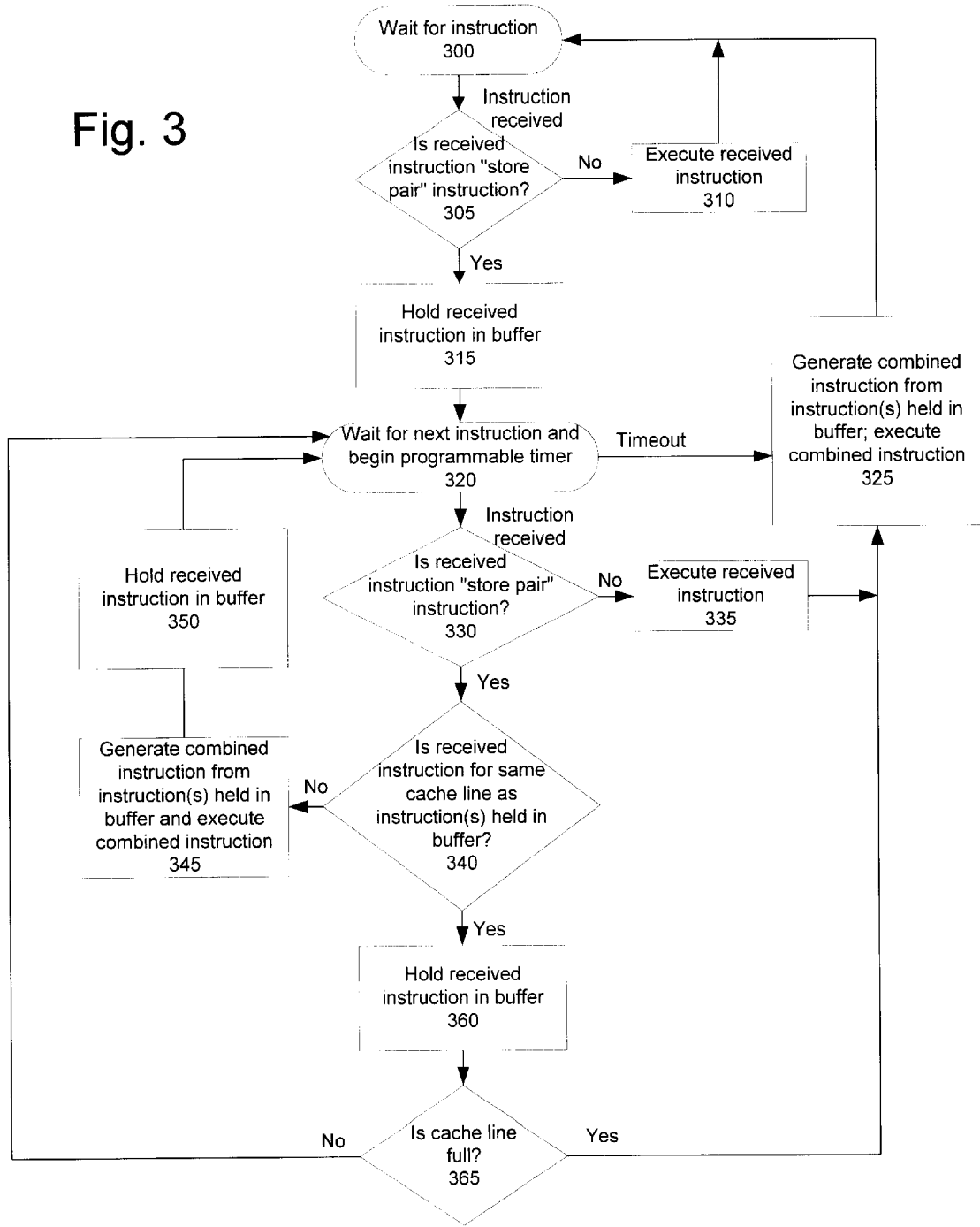
FIG. 3 is a flow diagram of one implementation of the operation of instruction combining logic 200.

FIG. 3 shows a flow diagram representing the operation of instruction combining logic 200, in accordance with one aspect of the invention. The operation begins at step 300, where control logic 210 waits for a memory access transaction or instruction. When control logic 210 receives an instruction, instruction identification logic 220 determines whether the received instruction is a "store pair" instruction (step 305). If not, control logic 210 outputs the received instruction for execution (step 310). If instruction identification logic 220 determines that the received instruction is a "store pair" instruction, buffer logic 240 holds the received instruction in buffer 260 (step 315). In one embodiment, buffer logic 240 stores the data to be written and the address at which the data is to be written in buffer 260.

Control logic 210 waits for the next instruction and begins programmable timer 250 (step 320). In a preferred embodiment, programmable timer 250 has previously been programmed to output a timeout signal if a preset amount of time has elapsed before being reset by control logic 210. If programmable timer 250 outputs a timeout signal before being reset, combined instruction generation logic 270 generates a combined instruction from the data and addresses held in buffer 260 and outputs the combined instruction for execution (step 325). If control logic 210 receives an instruction before programmable timer 250 outputs a timeout signal, operation flow moves to step 330.

Instruction identification logic 220 determines whether the received instruction is a "store pair" instruction (step 330). If not, the received instruction is output for execution (step 335) and combined instruction generation logic 270 generates a combined instruction from data and addresses in buffer 260 and outputs the combined instruction for execution (step 325). If instruction identification logic 220 determines that the received instruction is a "store pair" instruction, operation flow moves to step 340.

Cache line detection logic 230 determines whether the received "store pair" instruction includes data from the same cache line as the data stored in buffer 260 (step 340). If not, combined instruction generation logic 270 generates a combined instruction from the data and addresses stored in buffer 260 and outputs the combined instruction for execution (step 345). Buffer logic 240 then stores the data and address for the received instruction in buffer 260 and operation flow returns to step 320. If cache AN line detection logic 230 determines that the received "store pair" instruction includes data from the same cache line as the data stored in buffer 260, buffer logic 240 stores the data and address for the received instruction in buffer 260 (step 360) and operation flow moves to step 365.

Buffer logic 240 determines whether the data stored in buffer 260 corresponds to a full cache line (step 365). If so, combined instruction generation logic 270 generates a combined instruction from the data and addresses held in buffer 260 and outputs the combined instruction for execution (step 325). If not, operation flow returns to step 320.

Conclusion

It will be apparent to those skilled in the art that various modifications and variations can be made in the method and system of the present invention without departing from the spirit or scope of the invention. The present invention covers the modifications and variations of this invention provided they come within the scope of the appended claims.

What is claimed is:

1. A method comprising the steps of:
   receiving a first instruction to write a first data word at a first address of main memory;
   receiving a second instruction to write a second data word at a second address of main memory;
   determining whether the first instruction and the second instruction include data from the same cache line; and
   generating a combined instruction to write the first and second data words in the first and second addresses of main memory, respectively, if the first instruction and the second instruction are determined to include data from the same cache line.

2. The method of claim 1, wherein the first and second data words are 8 bytes in length.

3. The method of claim 1, wherein the cache line is 32 bytes in length.

4. A method comprising the steps of:
   receiving a first instruction to access a first data word at a first address of main memory;
   receiving a second instruction to access a second data word at a second address of main memory;
   determining whether the first instruction and the second instruction include data from the same cache line; and
   generating a combined instruction to access the first and second data words in the first and second addresses of memory, respectively, if the first instruction and the second instruction are determined to include data from same cache line.

5. The method of claim 4, wherein the first and second data words are 8 bytes in length.

6. The method of claim 4, wherein the cache line is 32 bytes in length.

7. A method comprising the steps of:
   (a) receiving a first instruction to write a first data word at a first address of main memory;
   (b) storing the first data word in a buffer;
   (c) receiving a subsequent instruction to write a data word at an address of main memory;
   (d) determining whether the first instruction and the subsequent instruction include data from the same cache line;

(e) storing the data word associated with the subsequent instruction in the buffer if the first instruction and the subsequent instruction are determined to include data from the same cache line;

(f) determining whether the data words stored in the buffer represent a full cache line;

(g) if the data words stored in the buffer are determined to not represent a full cache line, returning to step (c);

(h) if the data words stored in the buffer are determined to represent a full cache line, generating a combined instruction to write the data words stored in the buffer to main memory.

8. The method of claim 7, wherein the first data word and the data word associated with each subsequent instruction are 8 bytes in length.

9. The method of claim 7, wherein the cache line is 32 bytes in length.

10. A method comprising the steps of:

receiving a first instruction to write a first data word at a first address of main memory;

initiating a timer after the first instruction is received;

if a preset amount of time has elapsed on the timer before a second instruction is received, executing the first instruction; and if a preset amount of time has not elapsed on the timer before a second instruction is received, performing the steps of:

receiving the second instruction to write a second data word at a second address of main memory;

determining whether the first instruction and the second instruction include data from the same cache line; and generating a combined instruction to write the first and second data words in the first and second addresses of memory, respectively, if the first instruction and the second instruction are determined to include data from the same cache line.

11. A method comprising the steps of:

receiving a first instruction to write a first data word at a first address of main memory;

receiving a second instruction;

determining whether the second instruction is for writing a second data word at a second address of main memory;

if the second instruction is determined not to be for writing a second data word at a second address of main memory, executing the first and second instructions;

if the second instruction is determined to be for writing a second data word at a second address of main memory, performing the steps of:

determining whether the first instruction and the second instruction include data from the same cache line; and generating a combined instruction to write the first and second data words in the first and second addresses of main memory, respectively, if the first instruction and the second instruction are determined to include data from the same cache line.

12. An apparatus comprising:

means for identifying whether received instructions are write instructions;

a buffer;

means for storing portions of instructions determined to be write instructions in the buffer; and means for generating a combined write instruction including at least two of the received instructions based upon whether the portions of instructions stored in the buffer indicate that the at least two of the received instructions include data from the same cache line in a cache memory.

13. An apparatus comprising:

means for receiving a first instruction to write a first data word at a first address of main memory;

means for receiving a second instruction to write a second data word at a second address of main memory;

means for determining whether the first instruction and the second instruction include data from the same cache line; and means for generating a combined instruction to write the first and second data words in the first and second addresses of main memory, respectively, if the first instruction and the second instruction are determined to include data from the same cache line.

* * * * *